INVENTORS
GEORGE E. FRANCE
JACK PARKER

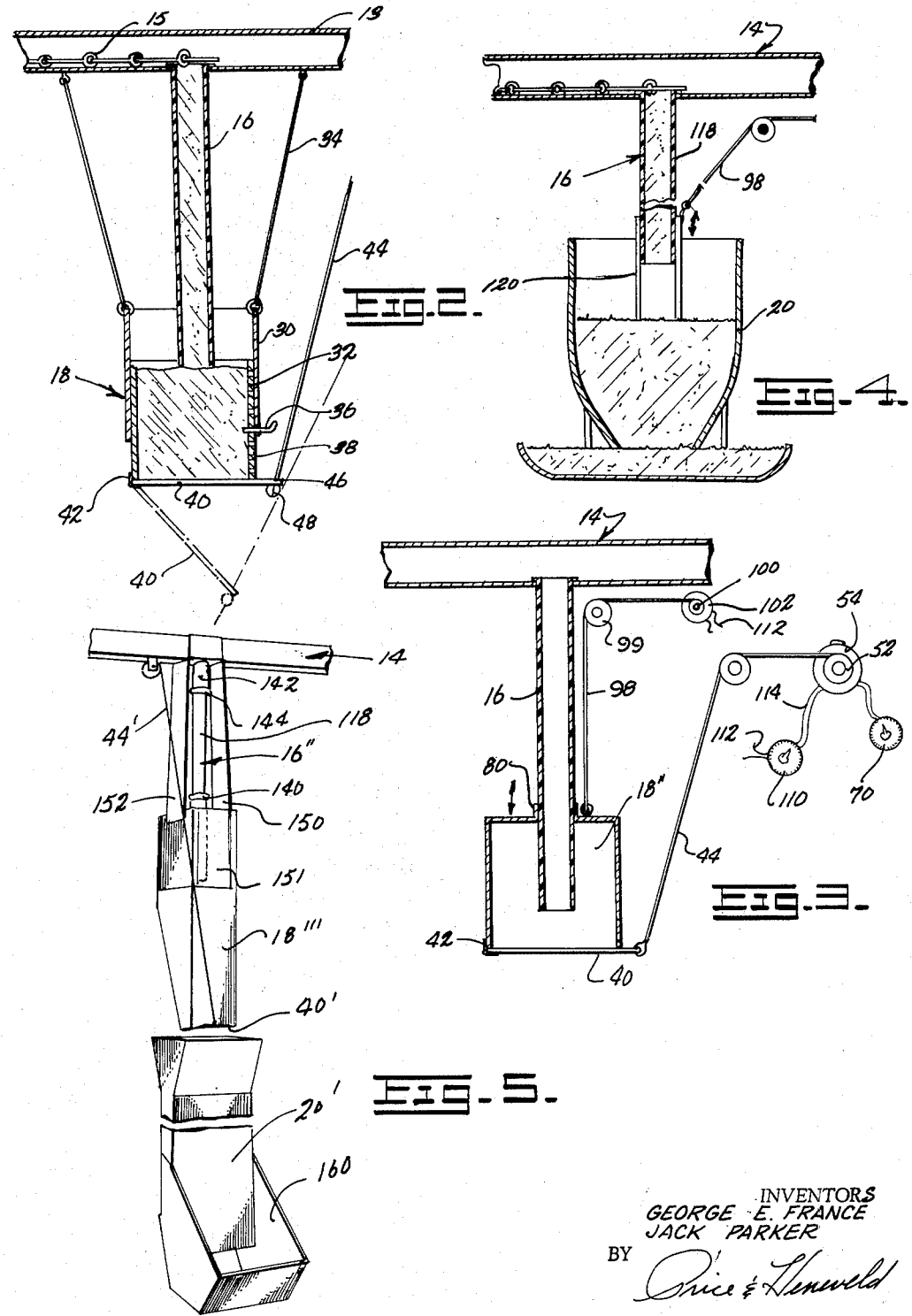

United States Patent Office 3,144,173
Patented Aug. 11, 1964

3,144,173
FEEDING APPARATUS
George E. France and Jack Parker, Holland, Mich., assignors to Automatic Poultry Feeder Company, Zeeland, Mich., a corporation of Michigan
Filed Nov. 23, 1962, Ser. No. 239,612
2 Claims. (Cl. 222—76)

This invention relates to animal feeding equipment, and more particularly to a system and apparatus for automatically feeding animals, such as hogs, exactly controlled quantities of feed at a predetermined time.

Automatic feeding of animals has come of age, and is being widely adopted today. Certain types of automatic feeding techniques, however, still cannot be practiced for pen feeding in an effective, practical, economical manner using conventional equipment without a plurality of hoppers and conveyors. One instance of a situation which cannot be readily and inexpensively accommodated with present equipment is the feeding of controlled and variable quantities of feed per pen to hogs in adjacent pens.

It is therefore a principal object of this invention to provide a system to automatically control variable quantities of feed to each of a plurality of pens at controlled times, with quantity variation amongst the pens, all from one hopper and conveyor trough, and using a completely inexpensive, readily manufactured, mechanical quantity control means. The amount of feed to each pen can be varied by a simple mechanical adjustment of telescoping parts. The animals have access to the feed only when desired. The entire system can be completely automated.

It is another object of this invention to provide an automatic feeding system utilizing simple, open-ended gravity feed downspouts from a single conveyor conduit in a manner that each downspout allows only a controlled feed quantity governed by the flowing feed itself. The feed actually performs as a plugging valve of the downspout when the exact pre-set quantity is obtained. The apparatus therefore employs the gravity flow characteristics of the feed both to get the full quantity predetermined, and then to stop the flow as soon as this quantity is obtained.

These and several other objects of this invention will be apparent upon studying the following specification in conjunction with the drawings, in which:

FIG. 2 is a fragmentary, elevational, sectional enlarged view through the upper control portion of the feeding apparatus in FIG. 1;

FIG. 3 is a fragmentary, sectional, elevational view of a second form of the inventive control apparatus;

FIG. 4 is a fragmentary sectional elevational view of a third modification of the inventive apparatus; and FIG. 5 is a perspective view of a fourth form of the invention.

Figure 1:
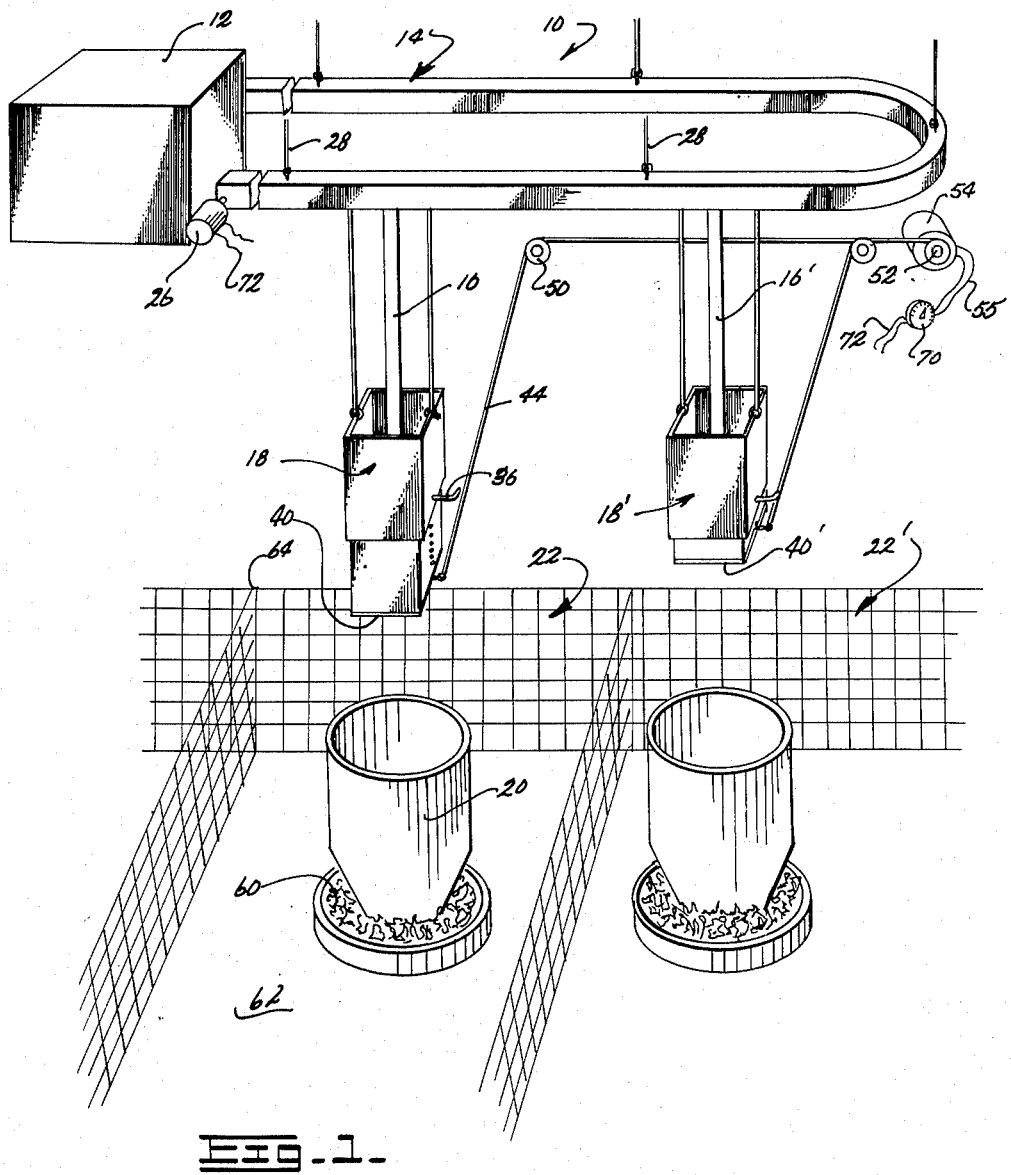
FIG. 1 is a perspective view of the first form of the novel feeding apparatus shown in combination with pens of animals.

Basically, the invention utilizes the flow properties of feed to obtain controlled quantities of feed, and comprises an elevated feed conduit and endless feed conveyor means, a plurality of open downspouts from the conduit, a receptacle beneath each of the downspouts, telescopically-variable, vertically-adjustable, feed quantity control means associated with each downspout and adapted to be vertically adjusted to control the distance between the bottom of the receptacle and the lower open end of the downspout to control the height of feed and therefore the amount of feed flow before the feed reaches the height of the lower open end of the spout and plugs the spout. In the preferred form of the invention, a telescopically adjustable container is positioned around the lower open end of the downspout to be vertically adjustable with respect to the spout, and includes lower gate means adapted to be normally closed during the receptacle filling and opened by an automatic mechanism to control the time of dumping into an animal access receptacle. The container around the downspout can itself be formed of two telescopically adjustable elements with locking means to hold them in any one position. The conveyor motor and a motor operating the gate means are both operated according to the signal of an electrical timer.

Referring now specifically to the drawings, the inventive feed control system 10 there illustrated includes a conventional storage and hopper means 12, endless conveyor and conduit means 14, a plurality of open ended, gravity flow downspouts 16 with telescopically adjustable temporary receptacle means 18, and an animal access receptacle 20 in each pen 22 under each downspout.

Hopper 12 may be mounted either inside the animal house (not shown) or outside the animal house, and either in an elevated position or adjacent the ground or floor as desired. The feed conveyor mechanism 14 includes a trough or conduit 13 and a suitable endless circuitous conveyor means 15 (FIG. 2) such as a drag chain, e.g. shown in U.S. Patent 2,737,823, which travels inside the feed trough and drags feed from storage hopper 12 to the plurality of downspouts (two of which are shown) and then returns to the hopper. This chain or equivalent conveying means is driven by an electric motor 26. The conduit means is elevated, preferably to an overhead position, to facilitate downspout flow, and may be suspended from the ceiling or roof of the animal house by suitable cables 28 or equivalent supporting means.

The downspouts 16, which may be of any desired cross-sectional configuration, are affixed to the lower side of conduit 13 around respective openings in the floor of the conduit. These downspouts are open on both ends to allow free flow of feed dragged along by the conveyor.

In the preferred forms of the invention, the lower end of each downspout terminates inside a temporary feed-gauging receptacle 18 of considerably larger diameter than the spout to retain sufficient feed for one feeding. This receptacle is preferably formed of two parts telescopically, vertically adjustable with each other. Of these two parts 30 and 32, the upper part is fixedly supported by suspending it on cables 34 from conduit 13 or in some other equivalent manner. Lower element 32 is telescopically adjustable either inside or outside the upper member 30. A suitable locking pin 36 inserted through an opening in outer member 30 fits through one of a plurality of openings 38 in inner member 32 to lock these adjustable elements in any particular pre-set position. A trap door or gate means 40 is mounted on the bottom of lower member 32 by hinges 42 to move from a normal closed position to an open, dumping position as illustrated in phantom in FIG. 2.

Opening and closing of this gate is periodically effected by a cable 44. This cable may pass through a loop 46 on the door and may include an adjustable stop 48 beneath the loop. The cable passes around suitable pulleys 50 and is wound upon a drum 52 operated by an electrical motor 54. When lower part 32 is vertically adjusted with respect to upper part 30, this obviously causes a slackening or tightening of cable 44. Adjustment of the cable is thus made by moving stop 48 along the cable. Alternatively, adjustment can be made by operating the motor temporarily and briefly to unwind or wind a portion of the cable sufficient to cause the cable to be taut only when the door is shut.

Positioned beneath gate means 40 is a suitable animal access receptacle 20 having an open top through which the feed can drop. It may have an annular access opening 60 where the animals eat all of the feed from receptacle 20. Alternatively the feed may be dropped directly onto the floor if desired.

This receptacle can be supported directly on a slatted floor 62 of a self-sufficient animal house like that disclosed and claimed in patent application Serial No. 162,808, filed August 18, 1961, entitled Animal Building Cleaning System, and assigned to the assignee herein. The pens 22 are defined by suitable fencing 64 around the four sides thereof.

Operation

When the conveyor chain 15 is operated by motor 26, feed from storage bin 12 is transferred through conduit 13 and flows downwardly by gravity through the open ended downspouts 16 into the temporary, measuring receptacles 18. The feed piles up on trap door 40 vertically in the temporary receptacle until it reaches the lower open end of downspout 16. Upon reaching the lower end of the downspout, the feed has sufficient friction between the particles to prevent its flowing up around the sides of the downspout, but rather it actually plugs the lower open end of the downspout to act as its own valving means. Then the feed merely fills the relatively small, narrow downspout 16. Preferably, this downspout is formed of a transparent or at least a translucent plastic material so that one can readily determine by observation whether the device is operating effectively. By withdrawing the pin 36, and adjusting lower element 32 upwardly or downwardly, and then re-inserting the pin to hold the receptacle at the proper position, the height between the gate means 40 on the bottom of the receptacle and the lower open end of the downspout 16 can be readily varied. Varying this height or relative spacing controllably alters the quantity of feed received in the receptacle from the downspout. Once the receptacle and downspout are filled, the conveyor chain will fill the next receptacle 18' to its controlled height through downspout 16'. It will be noted from referring to FIG. 1, that each temporary receptacle 18 can be pre-set to contain a substantially different quantity of feed than the adjacent receptacles 18' by setting the distance of the bottom gate means 40 and 40' different amounts from the lower ends of the downspouts 16 and 16'. Thus, the animals in one pen 22 will receive a greater allowance of feed when gate means 40 is opened than animals in the second pen 22', to thereby suit the number, breed, and age of the respective animals in each pen.

Ordinarily, the conveyor means need only be operated for a relatively short time to fill up the receptacles before discharge. The time required to fill all of the receptacles will vary with the number of receptacles and their size, the conveyor capacity, etc.

After the receptacles are filled by operation of motor 26 for a predetermined time as controlled by conventional timer means 70 through electrical leads 72 to motor 26, the timer 70 then deactivates motor 26, and activates motor 54 through leads 55 to operate the plurality of cables to the gate means 40, 40', etc. The plurality of gate means are then opened to dump the controlled quantities of feed into the animal access receptacles 20. After the feed is dumped, the gate means 40 and 40' are again closed by reverse operation of electric motor 54. Thus, by pre-setting the timer means 70, the conveyor motor 26 can be caused to operate at selected times during the day and/or night, with subsequent operation of motor 54 to dump the feed and close the gate means until the next refill. It will thus be obvious that once the preliminary settings are made on the receptacles 18 for the animals in the pens, the apparatus is completely automatic.

Second Form

In FIG. 3, a modified form of the invention is illustrated. As before, a suitable conveyor and conduit means 14 cooperates with a hopper means 12, with the conveyor being driven by a suitable motor 26. The downspouts 16 have mounted around the lower ends thereof a modified, telescopically adjustable, temporary receptacle 18″. The receptacle is here formed of only one larger telescoping part which has a narrow collar 80 slidable along the outside diameter of the downspout 16. This receptacle includes gate means 40 controlled by cable 44 wound and unwound from drum 52, controlled by forward and reverse motion of motor 54. Preferably, vertical adjustment of temporary receptacle 18″ to vary the spacing between the bottom 40 of the receptacle and the lower open end of downspout 16 is effected by a cable 98 passing around suitable sheaves 99 and wound upon a drum 100 controlled by motor 102.

Opening of the gate means 40 by the motor 54 may be controlled through a conventional timer 70, also used to control motor 26 of the conveyor as in FIG. 1. Motor 102, to raise or lower the temporary receptacle 18″, is operated by an on-off switch 110 electrically connected to motor 102 through leads 112. Since raising or lowering of the temporary receptacle 18″ will slacken or overtighten cable 44 controlling gate means 40, electrical leads 114 also extend between the on-off switch 110 and motor 54. Thus, when switch 110 is turned to the "on" position, both motors 102 and 54 are actuated to rotate in the same direction to either unwind or wind up the respective cables 98 and 44.

Thus, the volume in each receptacle is controlled by vertical adjustment of receptacle 18″ by motor 102 actuated by switch 110. Then timer 70 is pre-set to actuate motor 26 at specified times to operate the conveyor and fill receptacle 18″ and adjacent receptacles (not shown), as well as the downspouts 16. Then timer 70 actuates motor 54 to open the gate means 40 and dump the feed into the receptacles 20 as before. Instead of the motor operated adjustment means 98, 100, 102, a simple mechanical holding means with manual adjustment can be used as in FIG. 1.

Third Form

In FIG. 4 is illustrated still another and less preferred modification utilizing some of the basic principles of this inventive concept. In this form of the invention, the conveyor means and trough 14 are again cooperative with a hopper 12 and are located in an elevated position in the animal house to facilitate gravity flow through the downspouts. However, instead of utilizing a temporary receptacle 18 or 18′ in this form of the invention, each downspout 116 is itself actually composed of two open ended portions 118 and 120 which are telescopically, vertically adjustable with respect to each other. The lower open end of the lower element 120 extends directly into the animal access receptacle 20 as illustrated in FIG. 4. Thus, the distance between the lower end of element 120 and the bottom of receptacle 20 determines the height of the feed in the receptacle and thus the volume of quantity thereof. Telescopic adjustment with respect to the two elements 118 and 120 of the downspouts may be achieved using either a simple mechanical holding means as in FIG. 1, or may utilize a powered cable wind-up system illustrated in FIG. 3.

In operation, by raising or lowering element 120, its lower end is raised or lowered with respect to the bottom of receptacle 20 and thus the amount of feed is pre-set. However, the animals have access to the feed as soon as the conveyor means is actuated since there is no temporary receptacle and no gate means to control the exact time of dumping. Thus, the quantity cannot be as exactly controlled as before, since the animals will begin eating as soon as the feed begins falling and will constantly lower the level of the feed in receptacle 20. However, limited control is had over the feed quantity, and of the time of feeding by utilizing a timer means to control the motor 26 to operate only at selected times.

Fourth Form

In the fourth form of this invention illustrated in FIG. 5, the transparent plastic tube 16″ depending from the conveyor trough 14 is composed of a pair of telescopically adjustable elements 118 and 120 like those illustrated in FIG. 4. However, the adjustment between the two parts in FIG. 5 is manually effected. The two are frictionally held in any particular adjusted relationship by a circumferentially adjustable compressing band 140 similar to a conventional hose clamp. This compresses the two parts together to prevent their slippage movement with respect to each other. Similarly, the upper end of part 118 may be connected to a stub spout 142 by a second adjustable compressing band 144. In this form of the invention the temporary receiving receptacle 18‴ is fixedly mounted with respect to conveyor 14 on a pair of suspension supports 150 and 152. The trap door 40′ on the bottom of the temporary receiving receptacle is controlled by cable 44′ as previously. The feed ejected from the temporary receptacle passes into container 20′ having an opening 160 for animal access.

Preferably, a plastic transparent window 151 is provided on the front of temporary receptacle 18‴ to allow the operator to see and judge the position of the bottom of lower part 120 of the downspout with respect to lower outlet door 40′. This window may also be provided with quantity graduations to indicate the amount of feed in the receptacle at any particular height of the lower end of the downspout.

In operation, the conveyor drops feed through the downspout 16 to fill temporary receptacle 18‴ to the lower end of lower part 120 of the downspout as determined by the adjustment between the two parts 118 and 120. At any desired time interval the cable 44′ is operated to open the gate 40′ to dump the feed into container 20′.

Certain other structural modifications could conceivably be made in the inventive apparatus depicted to suit a particular situation or type of animal, while embodying the principles of this inventive concept. These obvious modifications are deemed to be part of this invention, which is to be limited not by the exemplary structures shown, but only by the structures as defined in the following claims, and the reasonably equivalent structures to those defined therein.

We claim:

1. An animal feeding system comprising: an elevated feed conduit and endless conveyor means for transferring feed; a plurality of spaced, gravity fed, open end downspouts from said conduit; a plurality of feed quantity control means, one around the open lower end of each downspout, and each including a receptacle beneath said lower end for supporting feed from the spout and retaining it to cause feed to build up to the level of said lower end where it is stopped by the feed itself; and remote control means to telescopically adjust the relative spacing of said receptacle and said lower end from each other to vary the depth of feed therebetween before the flow is stopped; said remote control means including an actuating member attached to each of said receptacles and extending vertically thereabove, and extending to and operably connected to a remote control operating and holding means for remote simultaneous actuation of said receptacles to regulate quantity.

2. An automatic animal feeding system, comprising: an elevated feed conduit and endless conveyor means for transferring feed; a plurality of gravity fed open ended downspouts from said conduit; a plurality of feed quantity control means, each around the open lower end of a respective downspout; said control means including portions telescopically vertically adjustable around the lower end of each of said downspouts; said portions including a temporary receiving container having gate means at the bottom end thereof; means to telescopically adjust and hold said bottom end with respect to the lower open downspout end to control the quantity of feed before said downspout is plugged by feed; mechanism to open and close said gate means to dump said feed from said container and downspout into access of the animals; motor means operatively connected to said endless conveyor; motor means operatively connected to said gate opening and closing mechanism; and timer means to periodically actuate said conveyor motor to fill the plurality of containers and downspouts, and to periodically actuate said gate motor to dump the feed to the animals; and remote control actuating motive means operably associated with each of said telescopic adjustment means to allow quantity control.

References Cited in the file of this patent

UNITED STATES PATENTS

| | | |
|---|---|---|
| 741,262 | Leighton | Oct. 13, 1903 |
| 811,038 | Croshier | Jan. 30, 1906 |
| 2,681,639 | Littlefield | June 22, 1954 |
| 3,026,845 | Winter | Mar. 27, 1962 |
| 3,033,163 | Hostetler et al. | May 8, 1962 |
| 3,085,552 | Pilch | Apr. 16, 1963 |